US011630420B2

(12) United States Patent
Kesti et al.

(10) Patent No.: US 11,630,420 B2
(45) Date of Patent: Apr. 18, 2023

(54) DETECTING MICROSCOPIC OBJECTS IN FLUIDS BY OPTICAL SENSING

(71) Applicant: Uponor Oyj, Vantaa (FI)

(72) Inventors: Tero Kesti, Tampere (FI); Esa Hamalainen, Nokia (FI)

(73) Assignee: Uponor Oyj, Vantaa (FI)

( * ) Notice: Subject to any disclaimer, the term of this patent is extended or adjusted under 35 U.S.C. 154(b) by 1023 days.

(21) Appl. No.: 16/310,541

(22) PCT Filed: Jun. 21, 2017

(86) PCT No.: PCT/FI2017/050463
§ 371 (c)(1),
(2) Date: Dec. 17, 2018

(87) PCT Pub. No.: WO2017/220860
PCT Pub. Date: Dec. 28, 2017

(65) Prior Publication Data
US 2019/0187613 A1 Jun. 20, 2019

(30) Foreign Application Priority Data
Jun. 22, 2016 (EP) .................................... 16175687

(51) Int. Cl.
*G03H 1/04* (2006.01)
*G01N 15/02* (2006.01)
(Continued)

(52) U.S. Cl.
CPC ....... *G03H 1/0443* (2013.01); *G01N 15/0227* (2013.01); *G01N 15/10* (2013.01);
(Continued)

(58) Field of Classification Search
CPC ......... G03H 1/0443; G03H 2001/0033; G03H 2001/0044; G03H 2001/0447;
(Continued)

(56) References Cited

U.S. PATENT DOCUMENTS

2004/0169903 A1 9/2004 Kreuzer et al.
2008/0008076 A1* 1/2008 Raguin ................ G11B 7/0065
(Continued)

FOREIGN PATENT DOCUMENTS

CN 105547945 A 5/2016
EP 2110697 A1 10/2009
(Continued)

OTHER PUBLICATIONS

Extended European Search Report re EP Application No. 16175687.9 dated Dec. 22, 2016.
(Continued)

*Primary Examiner* — Michael P LaPage
(74) *Attorney, Agent, or Firm* — Brooks Kushman P.C.

(57) ABSTRACT

A method having the steps of obtaining prepared image data captured by an image sensor receiving light propagated across a sample volume, containing a fluid possibly comprising microscopic objects of foreign origin, while illuminating the sample volume by coherent light. The prepared image data comprising, for a microscopic object, a prepared hologram pattern with prepared spatially alternating intensity formed by the interference fringes; providing filtered image data, comprising automatically filtering the prepared image data by an edge enhancing filter. the filtered image data comprising, for a prepared hologram pattern, a filtered hologram pattern. The presence of the microscopic object associated with the filtered hologram pattern in the sample volume of the fluid is automatically detected on the basis of the filtered hologram pattern.

18 Claims, 8 Drawing Sheets

(51) Int. Cl.
*G01N 15/10* (2006.01)
*G01N 15/14* (2006.01)
*G03H 1/00* (2006.01)

(52) U.S. Cl.
CPC . *G01N 15/1484* (2013.01); *G01N 2015/0233* (2013.01); *G01N 2015/1087* (2013.01); *G01N 2015/1093* (2013.01); *G03H 2001/0033* (2013.01); *G03H 2001/0044* (2013.01); *G03H 2001/0447* (2013.01)

(58) Field of Classification Search
CPC .............. G01N 15/0227; G01N 15/10; G01N 15/1484; G01N 2015/0233; G01N 2015/1087; G01N 2015/1093; G01N 21/453; G01N 21/85; G01N 2021/0378
See application file for complete search history.

(56) References Cited

U.S. PATENT DOCUMENTS

| | | | |
|---|---|---|---|
| 2013/0260396 A1* | 10/2013 | Akcakir | G01N 33/5029 435/7.25 |
| 2016/0187850 A1* | 6/2016 | Oh | H04N 19/124 359/9 |
| 2017/0045439 A1* | 2/2017 | Allier | G03H 1/0443 |
| 2017/0270388 A1* | 9/2017 | Vercruysse | G06K 9/6267 |
| 2017/0322516 A1* | 11/2017 | Hsiao | G03H 1/0866 |
| 2017/0333903 A1* | 11/2017 | Masaeli | G06V 20/698 |

FOREIGN PATENT DOCUMENTS

| | | | |
|---|---|---|---|
| WO | 2011049965 A1 | 4/2011 | |
| WO | 2015166009 A1 | 11/2015 | |
| WO | WO-2016024027 A1 * | 2/2016 | ......... G01N 15/0205 |

OTHER PUBLICATIONS

International Search Report re International Application No. PCT/FI2017/050463 dated Sep. 28, 2017.
Murakami, T., A New Direct Analysis Method for Measuring Particle Size and Location by Inline Hologram, Jan. 1, 1987, Laser Diagnostics and Modeling of Combustion, Springer Verlig, Heidelberg, Germany, pp. 71-76.
Guildenbecher et al., Accurate Measurement of Out-of-Plane Particle Displacement From the Cross Correlation of Sequential Digital In-Line Holograms, Optic Letters, Optical Society of America, US, vol. 38, No. 20, Oct. 15, 2013, pp. 4015-4018.
Christnacher, F., et al., Automatic Sizing of Particle Holographic Images via Optical Correlation and Edge Extraction, Optics Communications, vol. 108, No. 1-3, May 15, 1994, pp. 17-23.
Sobieranski, A., et al., Portable Lensless Wide-Field Microscopy Imaging Platform Based on Digital Inline Holography and Multi-Frame Pixel Super-Resolution, Light: Science & Applications (2015), vol. 4, e346, pp. 1-10.
Stybayeva, G., et al., Lensfree Holographic Imaging of Antibody Microarrays for High-Throughput Detection of Leukocyte Numbers and Function, Analytical Chemistry, vol. 82, No. 9, May 1, 2010, pp. 3736-3744.
Mudanyali, O., et al., Water Quality Management Using a Cost-Effective and Field-Portable Lensfree On-Chip Microscope, 14th International Conference on Miniaturized Systems for Chemistry and Life Sciences, Oct. 3-7, 2010, Groningen, The Netherlands.
Mudanyali, O., et al., Detection of Waterborne Parasites Using Field-Portable and Cost-Effective Lensfree Microscopy, Lab Chip, Jul. 2010, vol. 10, pp. 2419-2423.
Xia Fei et al, "Simulation Research of In-line Digital Holography for Particle Diameter Measurement", Journal of Shanghai University of Electric Power, vol. 24, No. 2, pp. 136-140, Jun. 30, 2008.
Liu Hongli et al, "Suspending Particle Edge Detection Method with Multi-scale and Multi-structural Elements", Journal of WUT (Information & Management Engineering), vol. 33, No. 3, pp. 346-348 and 378, Jun. 30, 2011.

* cited by examiner

Obtaining prepared image data

> Obtaining initial image data of the hologram digital image frame, the initial image data comprising, for a microscope object, an initial hologram pattern with initial spatially alternating intensity component — 211

> Automatically scaling down amplitude values of the initial spatially alternating intensity of the initial hologram patterns exceeding a predetermined threshold level — 212

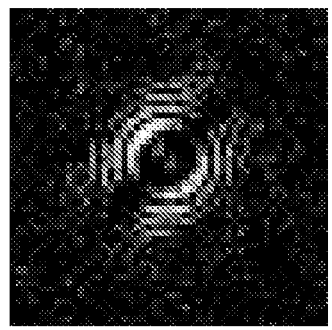
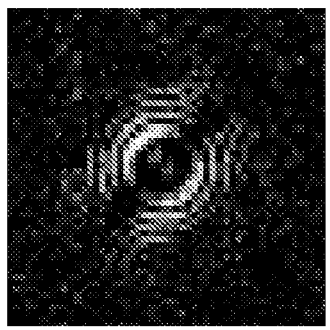
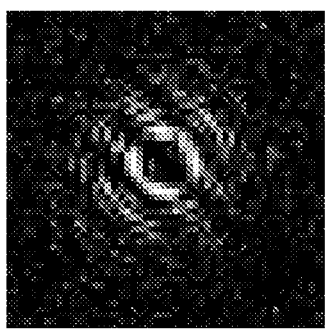
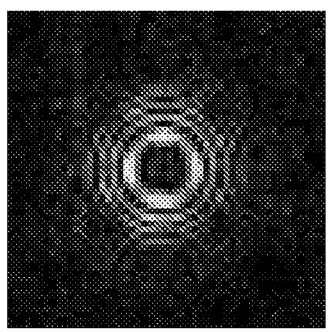
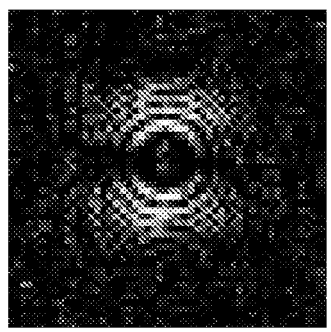
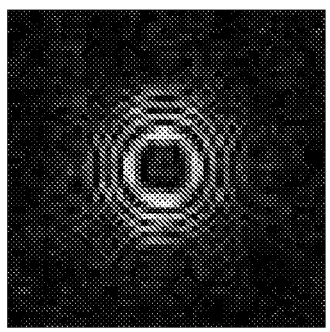
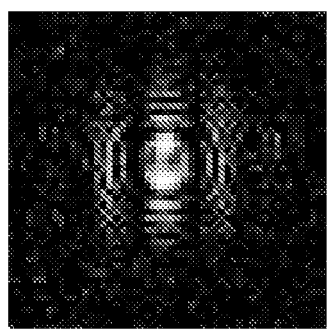
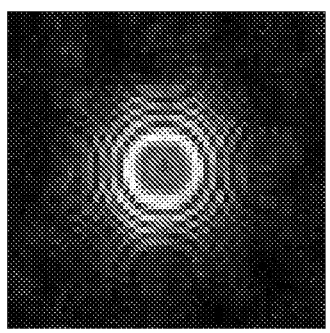
Fig. 10

DETECTING MICROSCOPIC OBJECTS IN FLUIDS BY OPTICAL SENSING

CROSS-REFERENCE TO RELATED APPLICATIONS

This application is the U.S. national phase of PCT Application No. PCT/FI2017/050463 filed on Jun. 21, 2017, which claims priority to EP Patent Application No. 16175687.9 filed on Jun. 22, 2016, the disclosures of which are incorporated in their entirety by reference herein.

FIELD OF THE INVENTION

The present invention relates generally to monitoring quality of fluids, such as water. In particular, the present invention relates to methods and apparatuses for monitoring microscopic particle or microbe content of fluids by means of optical sensing.

BACKGROUND OF THE INVENTION

Water quality is an important parameter for various applications where clean water is produced, supplied, or used. Water quality may be critical as well for the safety and health of people as end users of municipal water as for various industrial processes where water having specific quality requirements is used.

Conventionally, thorough water quality analysis has been carried out as a time-consuming laboratory process where a water sample is investigated by means of complex analysis instruments. However, for many applications, such as monitoring the water quality in water treatment plants, in municipal water supply networks, or in the internal water delivery in some critical types of residential water supply systems such as those on hospitals, elderly houses, or nurseries, as well as in certain industrial processes, much more rapid response time is necessary.

In-line holography or holographic microscopy has been proposed as one potential technology for rapid water quality monitoring. In US 2004/0169903 A1, an in-line holography method for tracking particles and life forms in sea water is disclosed. In another example, compact in-line holographic microscope for detection of pathogenic waterborne parasites is disclosed in Mudanyali O, Oztoprak C, Tseng D, Erlinger A, Ozcan A. Detection of waterborne parasites using field-portable and cost-effective lensfree microscopy. *Lab on a chip*. 2010; 10(18): 2419-2423.

In prior art holographic microscopy methods, the reconstruction phase in which the holographic image is reconstructed, using complex mathematical algorithms, into one or more two-dimensional images of the sample, requires burdensome and time-consuming calculations and powerful, expensive computing equipment. This may hinder implementation of small-size, low-cost sensor-level implementation of in-line holographic microscopy systems.

Similarly to water quality monitoring, also various other applications exist where foreign microscope objects in a fluid need to be detected and/or analyzed.

SUMMARY OF THE INVENTION

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one aspect, a method may be implemented which may be used for detecting microscopic objects of foreign origin present in a fluid. The method may be used, for example, for monitoring water quality in water supply, distribution, or use systems and networks wherein the microscopic objects may be, for example, impurity particles and/or microbes. Alternatively, the fluid may be some other liquid or gas.

The method may comprise: obtaining prepared image data originating from a hologram digital image frame captured by an image sensor receiving light propagated across, i.e. crosswise through, a sample volume, containing a fluid possibly comprising microscopic objects of foreign origin, while illuminating the sample volume by coherent light, whereby the possible microscopic objects scatter part of the light, the scattered and non-scattered light interfering so as to form interference fringes behind the microscopic objects, the prepared image data comprising, for a microscopic object, a prepared hologram pattern with prepared spatially alternating intensity formed by the interference fringes; providing filtered image data, comprising automatically filtering the prepared image data by an edge enhancing filter, possibly in two or more different directions, the filtered image data comprising, for a prepared hologram pattern present in the prepared image data, a filtered hologram pattern; and automatically detecting, on the basis of the filtered hologram pattern, the presence of the microscopic object associated with the filtered hologram pattern in the sample volume of the fluid.

In the method, some principles as such known from in-line holographic microscopy may be used.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein:

FIGS. 1 to 4 illustrate, as schematic flow diagrams, methods for detecting microscopic objects of foreign objects present in a fluid;

FIG. 10 illustrates partial filtered image data of a plurality of filtering operations which may then be combined or summed to form the filtered image data.

DETAILED DESCRIPTION

Figure 1:
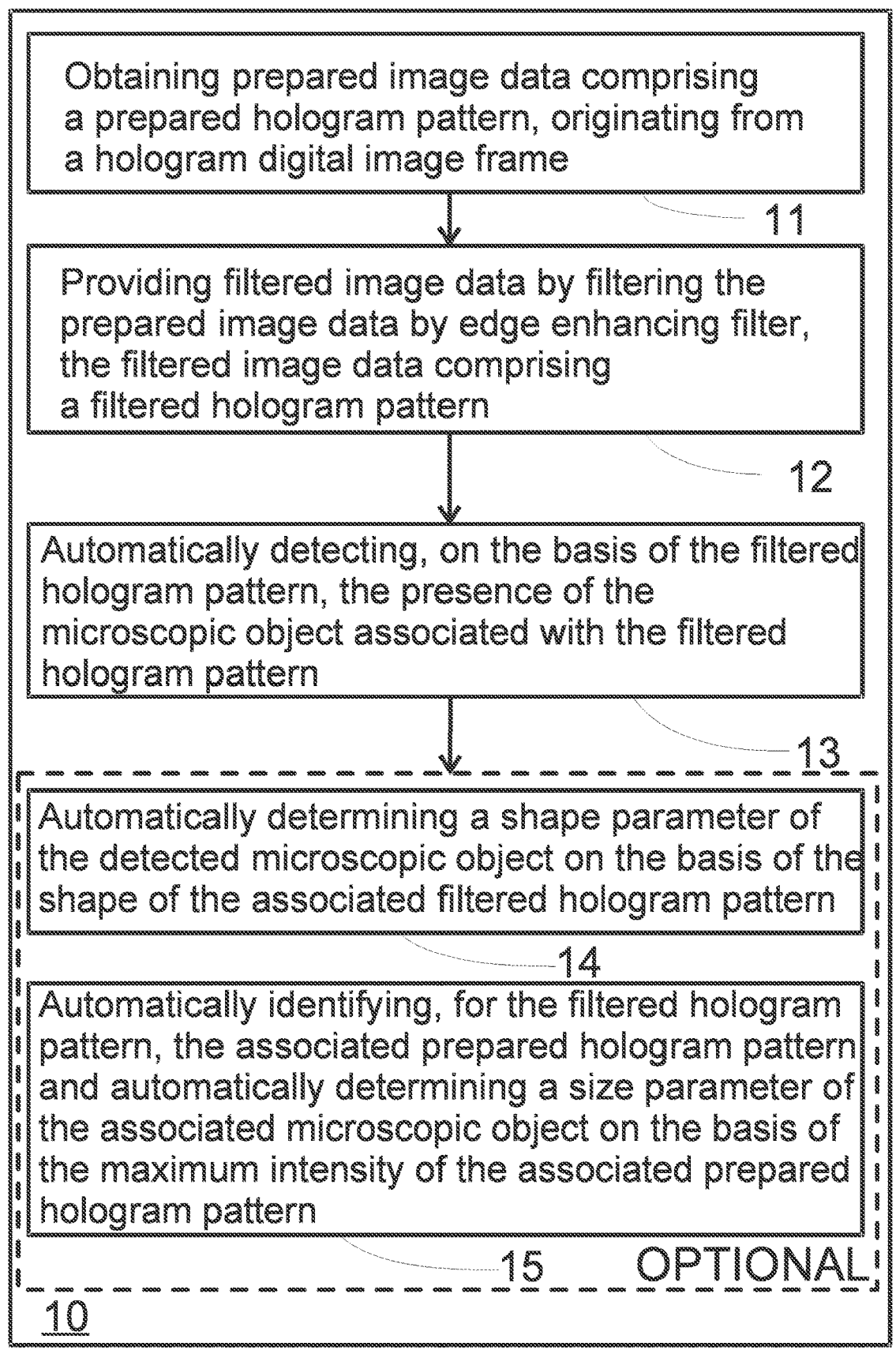

The method 10 of FIG. 1 comprises obtaining, in operation 11, prepared image data originating from a hologram digital image frame captured by an image sensor receiving light propagated across a sample volume which may be lie within, or be defined by, a cuvette, which sample volume contains a fluid possibly comprising microscopic objects of foreign origin, while illuminating the sample volume by coherent light.

Being defined by a cuvette refers to the extension, i.e. the shape and the dimensions, of the sample volume being physically limited or restricted by the cuvette. Such cuvette may have any appropriate shape and structure with one or more straight or curved walls which may determine the boundary of the sample volume. Alternatively, the sample volume may comprise only a part of an inner volume defined by the cuvette.

The expression "of foreign origin" refers to that the microscopic objects are not formed of the fluid itself. They may originate, for example, from the materials of pipes or containers in which the fluid at issue is conveyed or stored. Particles of the materials of such systems may be released to the fluid, for example, in result of a pipe breakage or equipment failure. Alternatively, microscopic objects of foreign origin may originate from foreign bodies or contaminants ended up within such pipes or containers. In the case of water supply systems, for example, such foreign body producing microbes into the fluid may be a dead animal.

In the case of water supply, distribution, or use systems and networks, microbes not normally present may be, for example, various bacteria, such as bacteria belonging to coliform or *Legionella* groups, protozoa such as *Giardia lamblia*, or various types of algae.

On the other hand, from the physical properties point of view, microscopic objects of foreign origin have typically, for example, a refractive index differing from that of the fluid. This enables detection of such objects by means of optical sensing. In the method of FIG. 1, this is utilized in that the detection of the microscopic objects is based on scattering of light by the microscopic objects due to the difference between the refractive indices of the microscopic objects and the fluid.

"An image sensor" refers to a light sensitive component or element capable of capturing digital image frames. The image sensor may comprise, for example, a CMOS (Complementary Metal Oxide Semiconductor) or any other appropriate type of sensor element as an active, light detection imaging element.

A "digital image frame", or shortly a "frame", refers to a data content captured via exposure of pixels or some other light-sensing element(s) of an image sensor. A frame thus generally comprises image data enabling composition of a displayable digital image on the basis of that image data. Image data of a digital image frame may comprise, for example, information about light energy received by pixels of an image sensor.

When illuminating the sample volume by the coherent light, the possible microscopic objects therein scatter part of the light, and the scattered and non-scattered portions of the illuminating light interfere so as to form interference fringes behind the microscopic objects.

Illuminating by coherent light refers to at least part of the light by which the sample volume is illuminated being spatially and temporally sufficiently coherent so that said interference is possible. Thus, "illuminating by coherent light" does not exclude the possibility of illuminating the sample volume at the same time also by non-coherent light. Thus, light by which the sample volume is illuminated may comprise coherent and non-coherent light.

"Behind" refers to the locations of the interference fringes as observed from the direction of incidence of the illuminating light, i.e. the coherent light by which the sample volume is illuminated. In other words, when observed from the location of a light source producing the coherent illumination light, the interference fringes are formed mainly behind the microscopic objects, i.e. at the side of the microscopic objects opposite to the side from which the coherent light is incident on the microscopic objects.

In consequence, the prepared image data originating from the hologram digital image frame comprises, for a microscopic object present in the path of the light received by the image sensor, a prepared hologram pattern with prepared spatially alternating intensity formed by the interference fringes.

The coherent light, i.e. the illuminating light, may be emitted or guided into an expanding cone or beam or into a collimated beam. In the former case, the interference fringes are expanded as function of the distance from the scattering microscopic objects. Further, irrespective of whether the illuminating light is emitted or guided into an expanding or into a collimated light beam, the interference fringes expand due to the scattering of the light into various directions, depending on the types of the microscopic objects and the wavelength of the illuminating light. Consequently, the longer the distance between a microscopic object and the image sensor, the larger is the hologram pattern formed on the image sensor.

From dimensional point of view, "microscopic objects" refer to objects having their characteristic dimensions, such as maximum diameter, length, or width, in the range of 0.1, 0.5 or 1.0 to 50 or 100 μm. Objects with so small characteristic dimensions are not visible to human eye, so they cannot be detected visually. On the other hand, holograms formed by that sized objects are detectable by image sensor having a reasonably small size. Further, with such micrometer scale characteristic dimensions, objects scatter light mainly forward, thereby enabling efficient detection by in-line holography.

The "prepared" image data "originating from" the hologram digital image frame refers to that the initial image data directly defined by the captured hologram digital image frame may be first prepared or processed in some appropriate way to produce the prepared image data forming the basis for the following operations of the method.

"Obtaining" the prepared image data of the hologram digital image frames or the image data thereof refers to any appropriate way of providing available, for automatic data processing and/or storage purposes, such data content. Ready generated prepared image data may be stored in any appropriate memory in the apparatus or in some other apparatus or device or, for example, in a cloud server. Such ready generated data content may be obtained in the method using any appropriate, wired or wireless data or signal transmission path. In some embodiments, said "obtaining" may also comprise generating the prepared image data or processing initial image data so as to produce the prepared image data.

With the prepared image data obtained, the method comprises, in operation 12, providing filtered image data. This comprises, in turn, automatically filtering the prepared image data by an edge enhancing filter so that the filtered image data comprises, for a prepared hologram pattern present in the prepared image data, a filtered hologram pattern.

As known for a skilled person, there are a great variety of known mathematical operations which may be used to filter image data for edge enhancing filtering purposes. Any appropriate edge enhancing filter may be used. Preferably, edge enhancing filter which enhances generally round or circular objects in the image data may be used.

Edge enhancing filters may me based on, for example, various edge detection algorithms. Generally, the principle in edge detection is to find out, by filtering image data by such edge detection algorithms, where there are relatively abrupt changes in the image content. For example, the parameter of interest used to find "edges" may be the intensity of light received by the image sensor during capture of the frame, i.e. the brightness of the image formed by the image data.

In result of filtering image data by an edge enhancing filter, the filtered image data generally highlights the edges, i.e. contours of distinguishable objects present in the original image data. In the case of filtering the prepared image data with the prepared hologram patterns, the filtered image data thus comprises the contours of the prepared hologram patterns in the form of the filtered hologram patterns.

On the basis of the filtered hologram patterns, further analysis of the image data can be focused on, or limited to, the actual locations of the hologram patterns in the image area. Great savings in the required computing power may then be saved because the rest of the image data does not need to be analyzed.

The edge enhancing filter may be a symmetric filter. A symmetric filter refers to one which substantially preserves the rotation symmetry, i.e. rotational shape information of the original pattern to be filtered. Thus, when using a symmetric filter, the original rotation symmetry of a prepared hologram pattern is preserved so that the shape of a filtered hologram pattern substantially corresponds to the shape of the associated prepared hologram pattern.

Instead of only one direction, filtering by the edge enhancing filter may be preferably carried out in two or more different directions. The more directions are used, the more accurately the filtered hologram pattern may follow the shape of the associated prepared hologram pattern.

In the case of carrying out the filtering in two or more directions, providing the filtered image data may comprise providing a plurality of filtered image frames each comprising partial filtered image data, and forming the final filtered image data by combining the partial image data of the plurality of filtered image frames. Thus, the prepared image data may be filtered with filters of different directions, each filter providing partial filtered image data, and the different partial image data may be then summed or combined to form the filtered image data. Different or the same types of filters may be used in differed filtering operations.

In addition to edge enhancing filtering, providing the filtered image data may comprise filtering the prepared image data by some other type of filter, such as by one or more filters enhancing the symmetry of the hologram patterns.

When carrying out the filtering in more than one direction, for each direction, the original prepared image data may be carried out on the original prepared image data, and the filtered image data may be then combined to form one single filtered image data.

In an embodiment, filtering the prepared image data by a symmetric edge enhancing filter comprises applying a convolution kernel to the prepared image data.

As known for a person skilled in the art, applying a convolution Kernel may comprise sliding the kernel over the image data. Alternatively, effectively the same result may be achieved by first making Fourier transforms of the image data and the kernel, multiplying those Fourier transforms, and making a reverse transform of the thereby achieved product.

As known for a skilled person, a convolution kernel comprises a two-dimensional filter matrix, each cell of the matrix defining a factor by which the corresponding cell or pixel of the image data to be filtered is multiplied. For a given cell or pixel of the image data, each of the values of that particular cell or pixel and its neighboring cells or pixels is multiplied by the respective cell of the matrix. The resulting products are summed, and the result is set as the value of that particular cell or pixel of the filtered image data.

As for edge enhancing filters and edge detecting algorithms in general, there are a great variety of ready specified kernel matrices suitable for enhancing and/or detecting edges in image data. Well-known examples of convolution kernels used for edge enhancement include Roberts, Prewitt and Sobel kernels. Commonly used edge detection algorithms include Canny and Deriche edge detectors.

In an embodiment, which may be in accordance with the previous embodiment where the convolution kernel is applied, in providing the filtered image data, filtering the prepared image data by an edge enhancing filter, which may be a symmetric filter, is carried out for at least two different spatial frequencies.

"Spatial" frequency refers to the spatial distance between adjacent interference fringes forming the prepared hologram. The closer are the adjacent interference fringes, the higher is the spatial frequency.

The spatial frequency of the interference fringes is affected both by the distance of the microscopic object from the image sensor, and the size of the microscopic object. Low spatial frequency of the interference fringes, possibly together with low intensity maxima thereof, may produce a gradual edge of the prepared hologram pattern. In contrast, high spatial frequency and/or high intensity maxima may produce a prepared hologram pattern with substantially sharper edges. Filtering the prepared image data for at least two different spatial frequencies may improve the reliability of the edge enhancing in the case where there are prepared hologram patterns with different edge sharpnesses in the prepared image data.

In the case of carrying out the filtering for two or more spatial frequencies, providing the filtered image data may comprise providing a plurality of filtered image frames each comprising partial filtered image data, and forming the final filtered image data by combining the partial image data of the plurality of filtered image frames. Thus, the prepared image data may be filtered with filters for different spatial frequencies, each filter providing partial filtered image data, and the different partial image data may be then summed or combined to form the filtered image data. Different or the same types of filters may be used in differed filtering operations.

Further, providing the filtered image data may comprise automatically filtering the prepared image data by plurality of filters each being configured to filter the prepared image data by a specific combination of filtering direction and spatial frequency. Partial filtered image data of such plurality of filtering operations may then be combined or summed to form the filtered image data. An example of this is illustrated in FIG. 10.

In FIG. 10, the left-hand column illustrates filtered image frames each produced by filtering a hologram pattern with a specific combination of filtering direction and spatial frequency. The left-hand column illustrates, from top to down, development a "cumulative" filtered image frame formed by combining the partial filtered image data of the different filtered images resulting from each filtering operation. The lowermost image frame of the right-hand column represents the final cumulative filtered image frame with the final filtered image data. For illustrative purposes, this final cumulative or combined filtered image frame is formed by combining therein also some partial filtered image data not illustrated in any of the filtered image frames of the left-hand column.

Interference fringes with alternating intensity may result in the filtering the prepared image data initially producing, for a prepared hologram pattern of the prepared image data, filtered spatially alternating intensity component with positive and negative values. This is because of also descending edges are determined as "edges". "Intensity component" refers to an alternating part of the spatially alternating intensity, possibly summoned to a spatially substantially constant or slowly changing base level. In an embodiment, which may be in accordance with any of the previous embodiments, providing the filtered image data comprises further automatically converting such negative values of the filtered spatially alternating intensity component into their absolute, i.e. positive values.

In an embodiment, after said conversion of the negative values of the filtered spatially alternating intensity component into their absolute values, the method further comprises automatically smoothing the filtered spatially alternating intensity component.

"Smoothing" refers, from general point of view, lowering the amplitude of the spatially alternating intensity component in the area of a filtered hologram pattern. Any appropriate filter(s) and algorithm(s) may be utilized to achieve this purpose. In result, the filtered image data may comprise locally increased intensity in the area of the filtered hologram pattern, the intensity within the filtered hologram pattern alternating only slightly or not at all.

The filtered image data may be further processed by thresholding locally increased intensity by automatically setting values thereof exceeding a predetermined threshold level to a specific constant intensity level, while converting the values remaining below said threshold value to zero, or to the possibly non-zero base level of the intensity outside the filtered hologram pattern. Thereby, the filtered image data may comprise the filtered hologram pattern as a binary image. Alternatively, the values exceeding the threshold level may be left unchanged.

From an image point of view, converting the initially negative values of the filtered spatially alternating intensity component into their positive counterparts, possibly followed by the smoothing and possible also by the thresholding, may result in filtered image data where the filtered hologram patterns form "blobs", i.e. areas with substantially constant or slightly alternating locally increased intensity.

Figure 5:
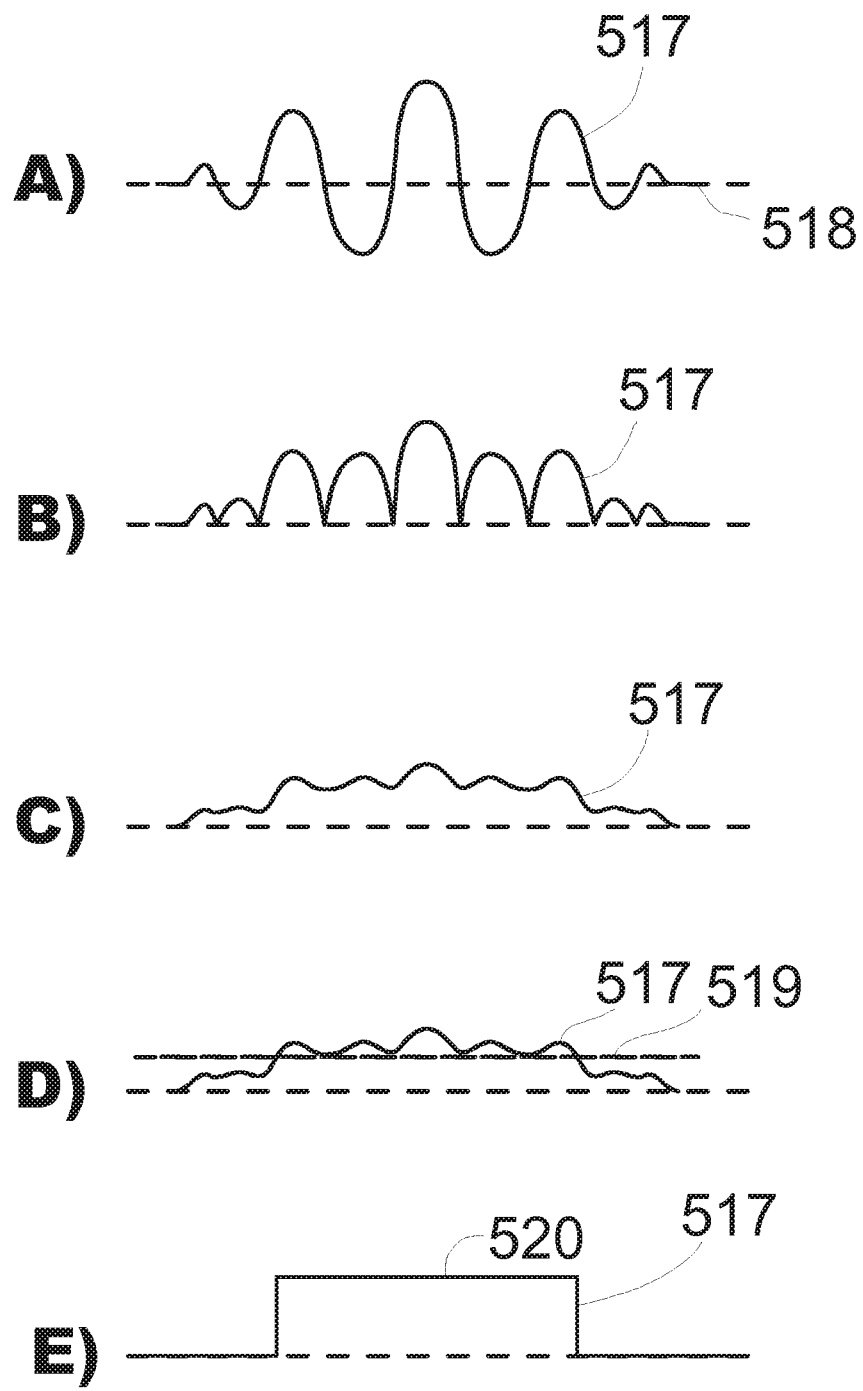
FIGS. 5 and 6 illustrate, as schematic block diagrams, apparatuses for detecting microscopic objects of foreign objects present in a fluid.

Operations of converting the negative intensity component values positive, smoothing the thereby achieved intensity component curve, and further thresholding the smoothened curve are illustrated in FIG. 5.

With the filtered image data available, the method further comprises, in operation 13, automatically detecting, on the basis of the filtered hologram pattern, the presence of the microscopic object associated with the filtered hologram pattern in the sample volume of the fluid.

Thus, possible filtered hologram pattern(s) of the filtered image data are used as indication of the presence of microscopic, scattering object(s) in the fluid contained in the sample volume.

Detecting the presence of the microscopic object "on the basis of the filtered hologram pattern" refers to utilizing the fact that the filtered hologram pattern, resulting from filtering the prepared image data with the prepared hologram pattern, originates from the presence of the microscopic object in the sample volume. Thus, detecting a filtered hologram pattern indicates the presence of the microscopic object of foreign origin in the sample volume.

To detect filtered hologram patterns in the filtered image data, any appropriate pattern recognition filter(s) or algorithm(s) may be used. For example, in the case of filtered hologram data with filtered hologram patterns comprising "blobs" as discussed above, various blob detecting filters and algorithms are known and may be used.

Detecting the presence of microscopic objects refers to determining whether there are any microscopic objects in the fluid. In this sense, detecting the presence of such objects may also comprise determining and concluding that there is no such object present in the fluid volume through which the illuminating light propagated to the image sensor. On the other hand, when there is a plurality of filtered hologram patterns in the filtered image data, the method may naturally comprise, in addition to determine the general presence of the microscopic objects, also the number of them in the analyzed fluid volume.

The result of the detection operation, i.e. the information about the presence of at least one microscopic object in the analyzed fluid volume, may be arranged in any appropriate electric data or signal form suitable for storage or transmitting further.

"Automatically" performing one or more operations of the method refers to performing the operation(s) at issue, for example, said detection of the presence of the microscopic object(s) in the fluid, by one or more appropriate data processing units or modules, according to predetermined rules and procedures, without need for any contribution provided or determination performed by a user of an apparatus or device incorporating such unit or module. In addition to those operations specifically stated to be performed automatically, also other operations may be carried completely or partially automatically.

Many advantageous effects may be achievable by the above method. First, determining the presence of microscopic objects in the fluid on the basis of the filtered image data requires relatively low computing or data processing power, especially in comparison to conventional holographic microscopy where a true reconstruction, at one or more two-dimensional planes of the three-dimensional sample volume, is calculated, and the detection of the scattering objects is carried out on the basis of the reconstructed image(s). On the other hand, the detection of microscopic objects may be carried out substantially faster than in the approach utilizing full reconstruction of the sample volume or two-dimensional sections thereof.

Savings in the required computational power and/or processing time may enable implementation of small-size, low-cost detection apparatuses for on-line operation, for example, for water quality monitoring.

Further, the sizes of the hologram patterns remain substantially unchanged during the edge enhancing filtering. Holograms are typically substantially larger than the actual objects, so in the above method, the noise possibly present in the image data is not as detrimental as in the case of detecting the smaller size objects in a reconstructed image.

As an optional operation 14, in addition to detecting the presence of microscopic object(s), the method may further comprise automatically determining at least one shape parameter of a detected microscopic object on the basis of shape of the associated filtered hologram pattern.

"A shape parameter" refers to any appropriate indicator depending on or indicating one or more features of the shape of the microscopic object.

Determination of a shape parameter may be based on predetermined relationship between the probable shapes of the microscopic objects and the associated shapes of the prepared and/or filtered hologram patterns. For example, an elongated object such as some particular bacteria types, typically produces a slightly elongated hologram. This shape may be mainly remained during edge enhancing filtering, allowing straightforward determination of a shape parameter of the original microscopic object on the basis of the filtered hologram pattern.

In determining the shape parameter of a microscopic object, any appropriate pattern recognition algorithm(s) may be used.

As another optional operation, not illustrated in FIG. 1, which may be carried out irrespective of whether the optional operation 14 discussed above is also carried out, the method may further comprise automatically determining at least one position parameter of a detected microscopic object on the basis of position of the associated filtered hologram pattern in the filtered image data.

"A position parameter" refers to any appropriate indicator depending on or indicating one or more characteristic features of the position of the microscopic object in the filtered image data. With the geometry of the sample volume, illumination, and the image sensor known, the position parameter(s) may be used to further determine a position parameter of the detected microscopic object in the sample volume at the time of capture of the hologram digital image frame.

Determined position parameter(s) may be used, for example, for various diagnostic purposes. For example, in the case of detecting microscopic objects with similar or same position parameters, it may be determined that those detected objects actually result from some impurity in the measurement or equipment.

As yet another optional operation 15, which may be carried out irrespective of whether the optional operation 14 discussed above and/or the previous optional operation not illustrated in FIG. 1 is carried out, the method may further comprise automatically identifying, for a filtered hologram pattern, the associated prepared hologram pattern in the prepared image data, and automatically determining at least one size parameter of the associated microscopic object on the basis of amplitude of the prepared or spatially alternating of the associated prepared hologram pattern. Thus, after detection of a filtered hologram pattern and thus a microscopic object of foreign origin, it may be evaluated i.e. identified, which prepared hologram pattern in the prepared image data produced that particular filtered hologram pattern. Size parameter(s) indicating the size of the associated microscopic object which produced the prepared hologram pattern may then be determined on the basis the amplitude of the prepared hologram pattern at issue.

"A size parameter" refers to any appropriate indicator depending on or indicating one or more characteristic features, such as diameter or length, of the associated microscopic object.

Alternatively, it may be possible to determine one or more size parameters of the detected microscopic object directly on the basis of the filtered image data, on the basis of the filtered hologram pattern thereof, assuming the filtered hologram pattern has sufficient amplitude information of the original prepared hologram pattern left.

"Amplitude" used in determining the size parameter(s) may refer to the amplitude of a spatially up and down alternating intensity component, possibly summoned to a spatially substantially constant or slowly changing base level. The amplitude of such intensity component, used in determining the size parameter(s) may be, for example, maximum or average peak or peak to peak amplitude, second largest peak or peak to peak amplitude, or any other appropriate amplitude related property of the intensity in the area of the prepared or filtered hologram pattern.

In those embodiments comprising determining one or more size parameters of the microscopic object, the correlation between the brightness of the interference fringes and the object size is utilized. The larger is the object, the higher is the intensity in the interference maxima of the interference fringes.

Any of the shape, position, and size parameters may be provided for further use or for storage as any appropriate electric data or signal form.

Further, in addition to the amplitude or brightness, also other parameters such as the spatial frequency of the interference fringes may be utilized in determining a size parameter of the microscopic object.

Identifying the prepared hologram patterns associated with the filtered hologram patterns may be based on comparison of the positions of the filtered hologram patterns and the prepared hologram patterns in the filtered image data and the prepared image data, respectively.

In an embodiment illustrated in FIG. 2, which may be in accordance with any of the previous embodiments, obtaining the prepared image data in operation 21 comprises obtaining, in sub-operation 211, initial image data of the hologram digital image frame, the initial image data comprising, for a microscope object present in the path of the coherent light, an initial hologram pattern with initial spatially alternating intensity component; and automatically scaling down, in sub-operation 212, amplitude values of the initial spatially alternating intensity of the initial hologram pattern exceeding a predetermined limit.

There may be situations where initial hologram patterns of two or more microscopic objects of substantially different sizes, producing different maximum brightnesses or amplitudes of the spatially alternating intensity of light, are so positioned that the weaker hologram is difficult to distinguish from the stronger one. In this embodiment, the distinguishability of such holograms may be improved by scaling down the highest intensity values.

Said scaling down may comprise simply cutting the maximum intensity to a predetermined maximum level. Alternatively, intensity values exceeding the limit may be scaled by multiplying them by a constant coefficient or by using a scaling function.

Figure 7:
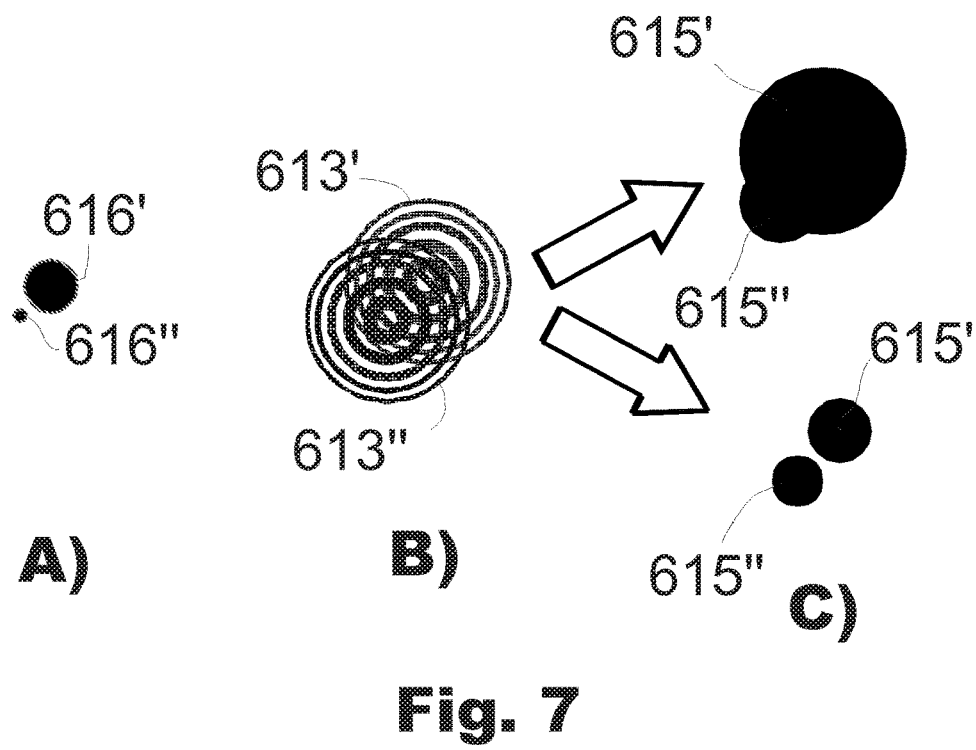
FIG. 7 illustrates the effect of scaling in the filtered hologram patterns.

The effect of scaling in the filtered hologram patterns is illustrated in FIG. 7.

The method and the embodiments thereof may be implemented as sampling processes where a stationary sample volume of a fluid is contained in a closed cuvette, the cuvette structure possibly defining the sample volume.

Alternatively, in some applications, microscopic objects present or borne in flowing fluid may be detected and possibly the properties thereof determined.

Figure 3:
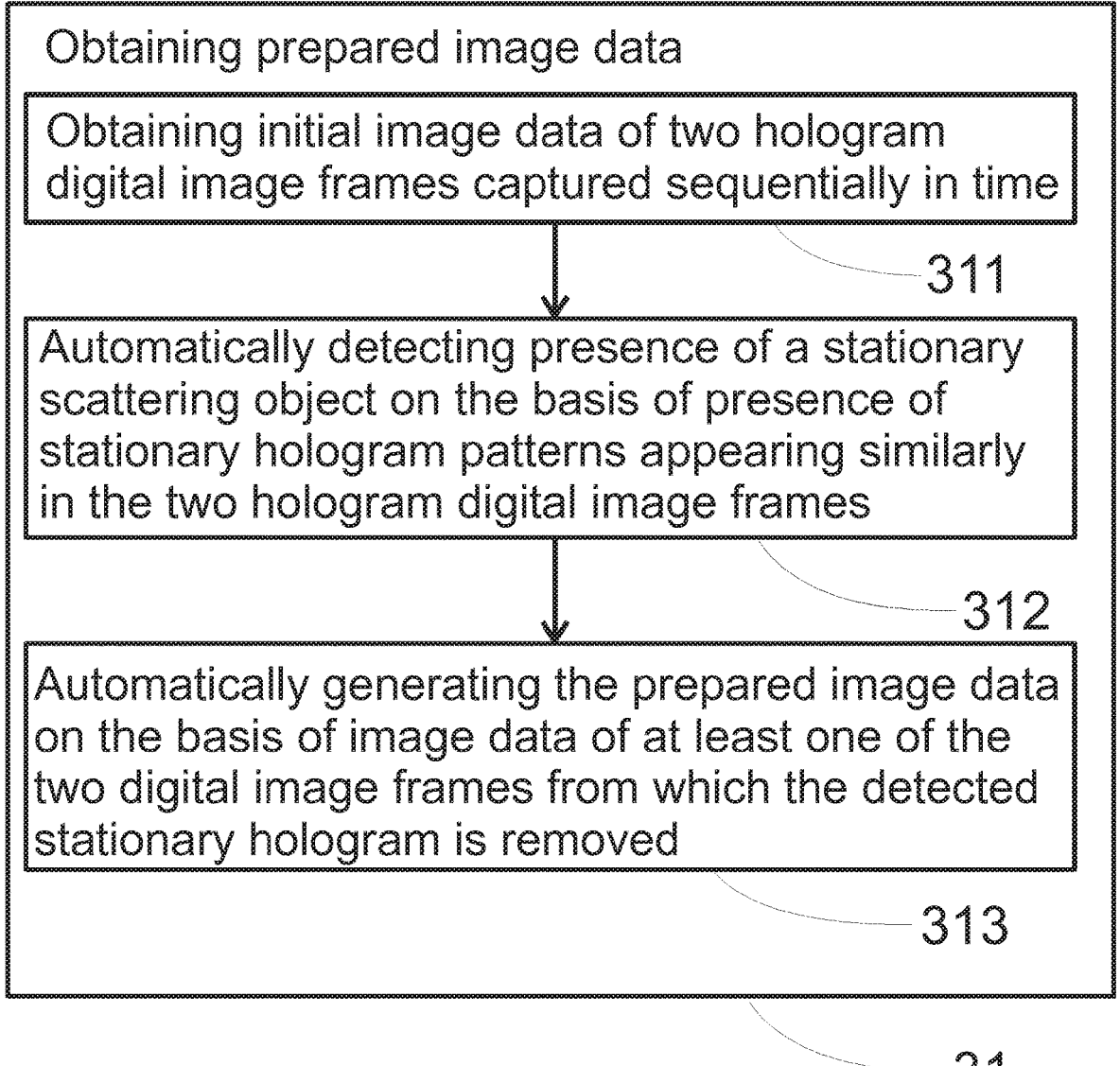

In an embodiment illustrated in FIG. 3, which may be in accordance with any of the previous embodiments, the analyzed fluid is flowing in the sample volume, and obtaining the prepared image data in operation 31 comprises obtaining, in sub-operation 311, initial image data of two hologram digital image frames captured sequentially in time; automatically detecting, in operation 312, presence of a stationary scattering object on the basis of presence of stationary hologram patterns appearing similarly in the image data of the two hologram digital image frames; and automatically generating, in sub-operation 313, the prepared image data on the basis of initial image data of at least one of the two digital image frames from which the detected stationary hologram is removed.

In this embodiment, the sample volume may lie within, or be defined by, a cuvette which may be closed and contain a constant fluid content, which however is in a non-stationary state, i.e. flows within the cuvette. Alternatively, the sample volume may lie within, or be defined by, a cuvette which may be of a flow-through type, wherein the fluid to be analyzed continuously flows through the cuvette and thus through the sample volume. The latter enables implementation of on-line sensors and detecting apparatuses.

The flowing motion of the fluid and the microscopic particles borne therein is utilized in this embodiment to remove any stationary hologram patterns produced, for example, by contamination adhered onto cuvette surfaces or elsewhere in the illuminating light propagation path. Then, the prepared image data is prepared so that possible such hologram patterns are not contained therein. The resulting prepared image data may comprise the initial image data of one of the two hologram digital image frames. Alternatively, the data content thereof may be defined as a combination of the initial image data of those two frames.

In an embodiment, image data one of the two hologram digital image frames may be composed of a plurality of sequentially captured hologram digital image frames.

In the above, the method is discussed with the focus on the actual data processing operations only. This indicates that the preceding phase of capturing the image data is not necessarily part of the method. This allows, for example, implementation of analysis devices or apparatuses which carry out the detection and determination of the microscopic objects separately from the actual illumination and image capture operations.

Figure 4:
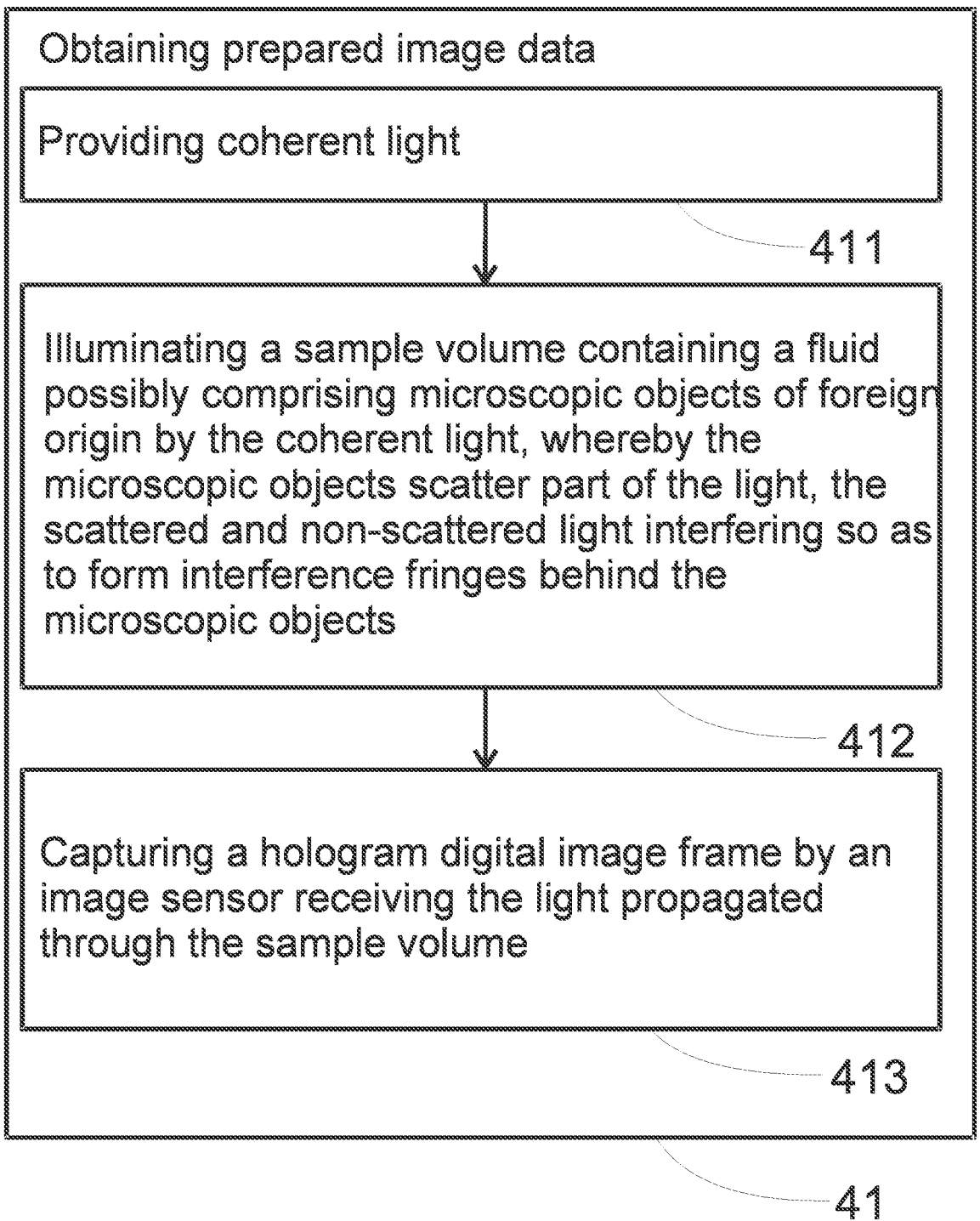

It is also possible to implement a complete detection method comprising those operations also. In an embodiment illustrated in FIG. 4, which may be in accordance with any of the previous embodiments, obtaining the prepared image data in operation 41 comprises providing, in sub-operation 411 coherent light; illuminating, in sub-operation 412, a sample volume, which may lie within, or be defined by, a cuvette, containing a fluid possibly comprising microscopic objects of foreign origin by the coherent light, whereby the microscopic objects scatter part of the light, the scattered and non-scattered light interfering so as to form interference fringes behind the microscopic objects; and capturing, in sub-operation 413 a hologram digital image frame by an image sensor receiving the light propagated across the sample volume.

In this embodiment, the method thus comprises also the actual illuminating and image capturing operations required to generate the prepared image data.

The image data of the captured hologram digital image frame may form, as such, the prepared image data. Alternatively, the prepared image data may be generated or produced, i.e. "prepared", by processing said image data by any appropriate operation(s).

In FIG. 5, some principles discussed above, which principles are usable in providing the filtered image data, are illustrated.

In graph 5 A) filtered spatially alternating intensity component 517 of a filtered hologram pattern, summoned to a base level 518 of the intensity of the filtered image data, is illustrated. The filtered spatially alternating intensity component has both positive and negative values.

In graph 5 B), the filtered spatially alternating intensity component is illustrated after converting the initially negative values of the filtered spatially alternating intensity component into their positive counterparts.

In the next phase, illustrated in graph 5 C), the filtered spatially alternating intensity component has been smoothed, resulting in intensity values in the area of the filtered hologram pattern slightly alternating above the base level.

In graph 5 D), a predetermined intensity component threshold level 519 is illustrated as marked on the spatially alternating intensity component curve.

Finally, graph 5 E) illustrates the intensity in the filtered hologram pattern after a thresholding operation in which the values of the intensity component exceeding the threshold level have been converted into a constant top level 520, whereas those values remaining below the threshold level 519 have been set to zero.

Figure 6:
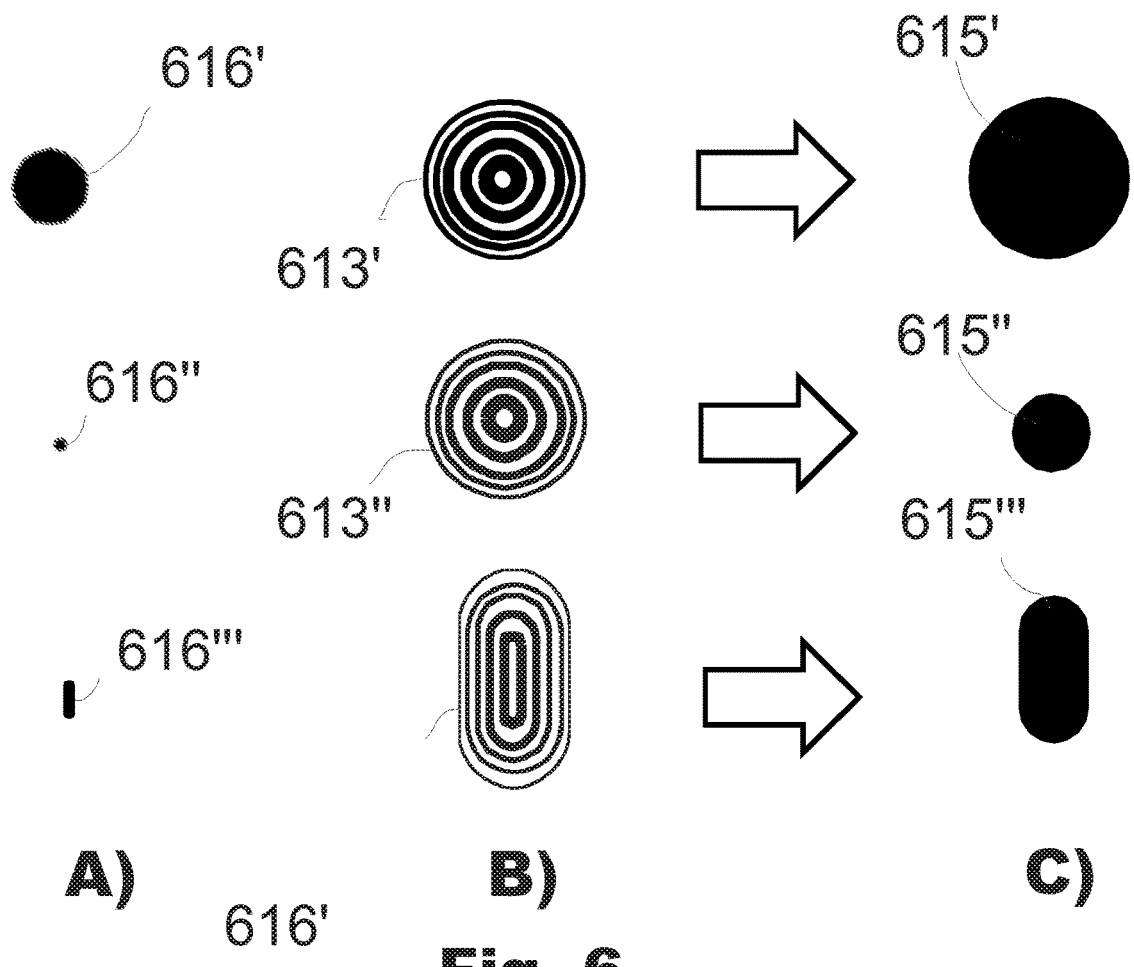

FIG. 6 illustrates relationship between concrete microscopic foreign objects and prepared and filtered hologram patterns resulting therefrom.

In drawing 6 A), two substantially point-like or round microscopic objects 616', 616" with different sizes, and one elongated microscopic object 616''', are shown. Drawing 6 B) illustrates schematically two round and one slightly elongated prepared hologram patterns 613', 613", 613''', respectively, resulting from the microscopic objects. The prepared hologram patterns are formed by concentric interference fringes. Although not visible in the drawings, the bigger the microscopic object is the brighter the interference fringes of the associated prepared hologram pattern are.

Drawing 6 C) illustrates the filtered hologram patterns 615', 615", 615''', initially resulting from the prepared hologram patterns, after operations similar to those illustrated in FIG. 5. In result of converting the negative values of the filtered spatially alternating intensity component into their positive counterparts, followed by smoothing and thresholding operations, the filtered hologram patterns of the filtered image data are plain blobs. The shapes of the blobs indicate the shape of the microscopic object, and the sizes thereof depend on the brightnesses of the prepared hologram patterns, and therefore on the sizes of the microscopic objects.

FIG. 7 illustrates the effect of the above-discussed scaling down amplitude values of the initial spatially alternating intensity of the initial hologram patterns exceeding a predetermined threshold level.

In drawing 7 A), two microscopic objects 616', 616" with significantly different sizes are shown, resulting in prepared hologram patterns 613', 613", shown in drawing 7 B), with significantly different brightnesses (the brightness difference is not visible in the drawing).

In drawing 7 C), two pairs of filtered hologram patterns 615', 615" in the form of blobs, resulting from two alternative processes are shown. First, the upper pair of blobs represents filtered hologram patterns with no scaling of the amplitude values of the initial spatially alternating intensity of the initial hologram patterns 613', 613".

The lower pair of blobs represents filtered hologram patterns when the amplitude values of the initial spatially alternating intensity of the initial hologram patterns exceeding a predetermined limit have been scaled down. As illustrated in drawing 7 C), the blobs of this lower pair are more clearly distinguishable from each other than those of the upper pair.

The method, various embodiments of which being discussed above may be used, for example, for monitoring quality of various fluids, such as water, or industrial process fluids where microscopic particle or microbe content of the fluid is an important parameter indicating the quality of the fluid. The method may further comprise initiating predetermined actions if the microscopic object content, i.e. the amount and/or type of detected microscope objects, meet predetermined criteria.

Such actions may comprise, for example, collecting a sample of the monitored fluid for further analysis, controlling a process or system in which the monitored fluid is contained or from which it is supplied, and/or generating an alarm signal.

The operations of the method and the various embodiments thereof explained above as being carried out at least partially automatically may be carried out by means of any suitable computing and/or data processing means. Such means may comprise e.g. at least one processor and at least one memory coupled to the processor. The at least one memory may store program code instructions which, when run on the at least one processor, cause the processor to perform operations according to various operations of the method. Alternatively, or in addition, at least some of those operations may be carried out, at least partially, by means of some hardware logic elements or components, such as Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc., without being limited to those examples.

What is stated above about the details, ways of implementation, preferred features, and advantages with reference to the method aspect apply, mutatis mutandis, also to the apparatus aspect discussed hereinafter. The same applies vice versa.

Figure 8:
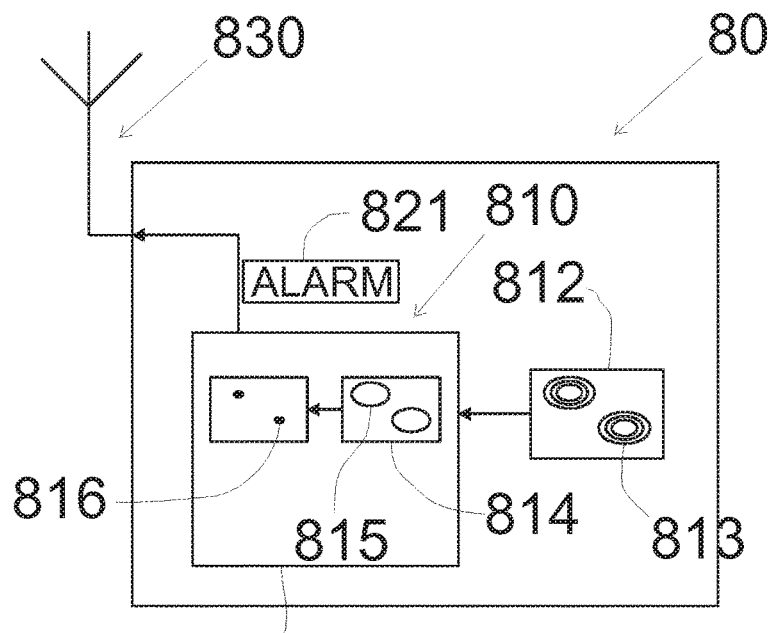
FIG. 8 illustrates an apparatus that may be used for detecting microscopic objects of foreign origin present in a fluid.

The apparatus 800 of FIG. 8 may be used for detecting microscopic objects of foreign origin present in a fluid. The apparatus comprises a computing arrangement 810 configured to perform the operations of the above method of the first aspect or any embodiment thereof, except of the operations of providing coherent light, illuminating a sample volume, and capturing a hologram digital image frame.

The computing arrangement may comprise any appropriate data processing and communicating equipment, unit(s), element(s), and component(s) capable of carrying out the operations of the method discussed above.

In the example of FIG. 8, the computing arrangement 810 comprises a processing unit 811 configured to carry out the operations of obtaining the prepared image data 812 comprising prepared hologram patterns 813; providing the filtered image data 814 comprising filtered hologram patterns 815; and automatically detecting the presence of microscopic objects 816 on the basis of the filtered hologram patterns.

Although illustrated in FIG. 8 as obtaining, when in use, ready generated prepared image data, the computing unit may alternatively be configured to carry out any of the specific ways of obtaining the prepared image data discussed above with reference to various method embodiments.

Further, the computing arrangement may be configured to provide the filtered image data in accordance with any of the method embodiments discussed above.

From another terminology point of view, a computing arrangement or processing unit thereof "configured to" perform a specific method operation means that the computing arrangement or processing unit comprises, or serves as, "means for" performing that operation.

The computing arrangement may comprise separate means for different operations. Alternatively, any of such means for performing those various operations specified above may be combined so that more than one operation is carried out by the same means. It is even possible that all those operations are carried out by the same means, e.g. by a single data processing module or unit. In the example of FIG. 8, this is illustrated by the processing unit 811.

Any means for performing any of the above operations may comprise one or more computer or other computing and/or data processing components, units, devices, or apparatuses. In addition to actual computing and/or data processing means, the means for performing said operations may naturally also comprise any appropriate data or signal communication and connecting means, as well as memory or storage means for storing generated and/or received data.

Computing and/or data processing means, such as the processing unit 811 of the example of FIG. 8, serving as means for performing one or more of the above operations may comprise, for example, at least one memory and at least one processor coupled with the at least one memory. Then, the at least one memory may comprise computer-readable program code instructions which, when executed by the at least one processor, cause the apparatus to perform the operation(s) at issue.

In addition to, or instead of, a combination of a processor, a memory, and program code instructions executable by the processor, means for performing one or more operations may comprise some hardware logic components, elements, or units, such as those examples mentioned above with reference to the method aspect.

In addition to actual detection of microscopic objects in the fluid to be analyzed, computing arrangement 810, in practice the processing unit 811 thereof, is configured to generate an alarm signal 821 indicating that a predetermined criteria for microscopic particle amount, type, or, for example, average size, are met. The apparatus comprises transmitting arrangement 830 to transmit such alarm signal from the apparatus, for example, to some centralized control system. The transmitting arrangement may comprise, for example, wireless data communication means including, for example, an antenna. The transmitting arrangement and the operation of generating an alarm signal are optional features, and embodiments without those features are also possible.

In the above, the apparatus is defined as comprising the computational or data processing means only. In an embodiment illustrated in FIG. 9, which may be in accordance with any of the previous embodiments, a complete detecting apparatus 900 is implemented, differing from that of FIG. 8 in that it comprises, in addition to the computing arrangement 910, also a measurement arrangement 940 configured to carry out capturing of the image data to be processed by the computing arrangement. Thus, in this approach, the apparatus also comprises means for performing the measurements of the physical quantity.

In more detail, the measurement arrangement comprises a cuvette 941 defining a sample volume for receiving a fluid 942 possibly containing microscopic objects 916 of foreign origin; an illuminating arrangement 950 configured to emit coherent light 951 and illuminate the fluid received in the sample volume by the coherent light, whereby the possible microscopic objects scatter part of the light, the scattered and non-scattered light interfering so as to form interference fringes behind the microscopic objects; and an image sensor 960 positioned and configured to capture a hologram digital image frame by receiving the light propagated across the cuvette and the sample volume therein.

In this embodiment, the computing arrangement 910 is connected to the measurement arrangement 940 to receive image data of the captured hologram digital image frame(s) 970 which form the basis for the prepared image data. The computing arrangement may also be configured to control the measurement arrangement, and the illuminating arrangement and the image sensor thereof.

A "cuvette" refers to any appropriate sample cell or container capable of receiving the fluid to be analyzed. A cuvette may comprise one or more walls defining an inner volume thereof for receiving said fluid. Defining the inner volume means that the one or more walls limit or surround a cross-section of the inner volume throughout a perimeter thereof. In other words, the one or more walls and/or some other appropriate structure of the cuvette completely encircles the entire inner volume at least at one cross-section thereof, thereby preventing escaping of the fluid to me measured from the inner volume in directions in the plane of such cross-section.

A cuvette and a measuring arrangement incorporating it as a whole may have any appropriate dimensions, taking into account the application at issue. For example, the thickness of the inner volume in the direction of incidence of the illuminating light may be, for example, in the range of 0.5 to 1 mm. The width of the cuvette may be adjusted, for example, on the basis of the size of the light sensitive cell of the image sensor which may lie, for example, at a distance of about 1 to 3 mm from the inner volume of the cuvette. For example, the cuvette may have, in one or more directions, a width of 4 to 8 mm. One pixel of the light sensitive cell may have a width, for example, in the range of 1.5 to 5 μm. For example, the width of a rectangular pixel may be about 2 μm. The positioning of the light source of the illuminating arrangement may vary depending on, for example, on the light source and the size of the light emitting surface thereof. In an example, a laser diode as a light emitting element of a light source may be positioned at some tens of millimeters, for example about 40 mm, from the inner volume of the cuvette.

Figure 9:
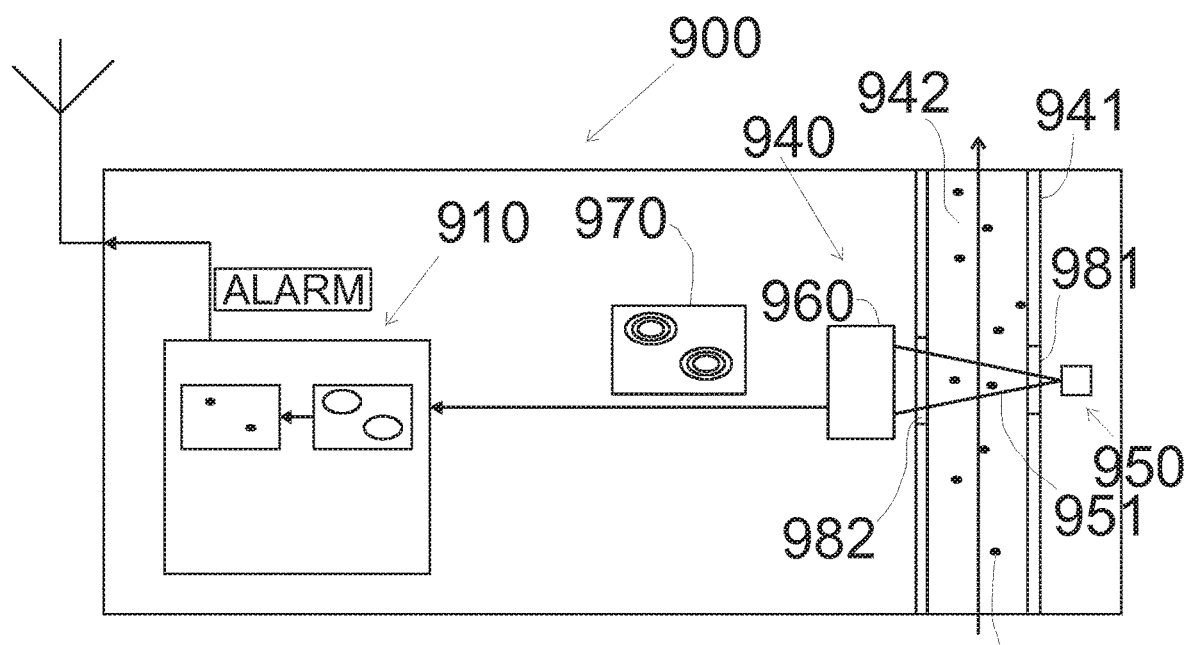
FIG. 9 illustrates an embodiment, which may be in accordance with any of the previous embodiments, a complete detecting apparatus, differing from that of FIG. 8 in that it comprises, in addition to the computing arrangement, also a measurement arrangement configured to carry out capturing of the image data to be processed by the computing arrangement.

In general, a cuvette may be of sampling type, wherein a discrete volume may be stored in the cuvette. In the example of FIG. 9, it is of a flow-through type, wherein continuous flow of the fluid 942 to be analyzed may be led through the cuvette during the analysis. In other embodiments, other types of cuvettes may be used. For example, in some embodiments, a cuvette may be configured to serve alternatively as a sampling type cuvette or as a flow-through cuvette.

The cuvette comprises windows 981, 982 allowing the illuminating light emitted by the illuminating arrangement to enter and exit the cuvette. In the example of FIG. 9, the illuminating arrangement and the image sensor are positioned at opposite sides of the cuvette to form a direct propagation path of light from the illuminating arrangement to the image sensor via the cuvette.

The illuminating arrangement may comprise any appropriate light source, such as a laser diode, capable of producing coherent light. The light may have wavelength(s), for example, in the range of 350 to 500 nm, without being limited to that range. The illuminating arrangement may further comprise any appropriate optical elements configured to guide the emitted coherent light towards the cuvette and the sample volume to illuminate the fluid received therein.

The image sensor 960 may be of any appropriate type. For example, it may comprise a CMOS (Complementary Metal Oxide Semiconductor) or CCD (Charge-Coupled Device) cell. The image sensor may be a black and white type sensor. Suitable size of the active area and the resolution of the image sensor depend on the overall configuration of the measurement arrangement. In some applications, it may have, for example, a size of 5×5 mm2. In some applications, the active area of the image sensor may have, for example, 5 million pixels.

The apparatuses of FIGS. 8 and 9 may be implemented as stand-alone apparatuses or sensors. Alternatively, they may form a part of a larger controlling or monitoring system.

In yet another aspect not illustrated in the drawings, a computer program product may be implemented comprising program code instructions which, when executed by a processor, cause the processor to perform the operations discussed above with reference to method aspect or any embodiment thereof.

Such computer program product may be stored on any appropriate computer-readable medium; computer referring here to any type of automatic computing means.

It is to be noted that the present invention is not limited to the embodiments and examples above. Instead, the embodiments of the present invention can freely vary within the scope of the claims.

It will be understood that the benefits and advantages described above may relate to one embodiment or example or may relate to several embodiments or examples. The embodiments and examples are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

The invention claimed is:

1. A method for detecting microscopic objects of foreign origin present in a fluid, the method comprising:
   receiving a hologram digital image frame captured by an image sensor receiving light propagated across a sample volume, containing a fluid possibly comprising microscopic objects of foreign origin, while illuminating the sample volume by coherent light to create prepared image data, whereby the possible microscopic objects scatter part of the light, the scattered and non-scattered light interfering so as to form interference fringes behind the microscopic objects, resulting in a hologram pattern with spatially alternating intensity formed by the interference fringes;
   generating filtered image data, comprising automatically filtering the prepared image data as such without further processing, the filtering being performed by an edge enhancing filter to create the filtered image data, the filtered image data comprising a filtered holograph pattern resulting from the filtering of the hologram pattern; and
   automatically detecting, on the basis of the filtered hologram pattern, the presence of the microscopic object associated with the filtered hologram pattern in the sample volume of the fluid.

2. The method as defined in claim 1, wherein the edge enhancing filter is a symmetric filter.

3. The method as defined in claim 1, wherein the prepared image data is filtered by the edge enhancing filter at least in two different directions.

4. The method as defined in claim 3, wherein providing the filtered image data comprises providing a plurality of filtered image frames each comprising partial filtered image data, and combining the partial filtered image data of the plurality of filtered image frames into the filtered image data.

5. The method as defined in claim 1, further comprising automatically determining at least one shape parameter of a detected microscopic object on the basis of shape of the associated filtered hologram pattern.

6. The method as defined in claim 1, further comprising automatically determining at least one position parameter of a detected microscopic object on the basis of position of the associated filtered hologram pattern in the filtered image data.

7. The method as defined in claim 1, further comprising automatically identifying, for a filtered hologram pattern, the associated prepared hologram pattern in the prepared image data, and automatically determining at least one size parameter of the associated microscopic object on the basis of amplitude of the prepared spatially alternating intensity of the associated prepared hologram pattern.

8. The method as defined in claim 1, wherein obtaining the prepared image data comprises obtaining initial image data of the hologram digital image frame, the initial image data comprising, for a microscopic object, an initial hologram pattern with initial spatially alternating intensity component; and automatically scaling down amplitude values of the initial spatially alternating intensity component of the initial hologram pattern exceeding a predetermined limit.

9. The method as defined in claim 1, wherein filtering the prepared image data by an edge enhancing filter comprises applying a convolution kernel to the prepared image data.

10. The method (10) as defined in claim 1, wherein filtering the prepared image data by an edge enhancing filter is carried out for at least two different spatial frequencies.

11. The method as defined in claim 1, filtering the prepared image data initially producing, for a prepared hologram pattern, a filtered spatially alternating intensity component with positive and negative values, wherein providing the filtered image data further comprises automatically converting the negative values into their absolute values.

12. The method as defined in claim 11, wherein providing the filtered image data further comprises automatically smoothing the filtered spatially alternating intensity component.

13. The method as defined in claim 1, wherein the fluid is flowing in the sample volume, wherein obtaining the prepared image data comprises:

obtaining initial image data of two hologram digital image frames captured sequentially in time;

automatically detecting, on the basis of the initial image data of the two hologram digital image frames, presence of any stationary scattering object on the basis of presence of stationary hologram patterns appearing similarly in the image data of the two hologram digital image frames; and automatically generating the prepared image data on the basis of at least one of the initial image data from which any stationary hologram detected is removed.

14. The method as defined in claim 1, wherein obtaining the prepared image data comprises:

providing coherent light;

illuminating a sample volume containing a fluid possibly comprising microscopic objects of foreign origin by the coherent light, whereby the possible microscopic objects scatter part of the light, the scattered and non-scattered light interfering so as to form interference fringes behind the microscopic objects; and capturing a hologram digital image frame by an image sensor receiving the light propagated across the sample volume.

15. An apparatus for detecting microscopic objects of foreign origin present in a fluid, the apparatus comprising a computing arrangement configured to perform the operations of the method as defined in claim 1.

16. The apparatus as defined in claim 15, further comprising a measurement arrangement comprising:

a cuvette defining a sample volume for receiving a fluid possibly comprising microscopic objects of foreign origin;

a coherent light emitter configured to illuminate fluid received in the sample volume by the coherent light, whereby the possible microscopic objects scatter part of the light, the scattered and non-scattered light interfering so as to form interference fringes behind the microscopic objects; and an image sensor positioned and configured to capture a hologram digital image frame by receiving the light propagated across the sample volume;

the computing arrangement being connected to the measurement arrangement to receive image data of the hologram digital image frame.

17. The apparatus as defined in claim 16, wherein the cuvette is of flow-through type.

18. A non-transitory computer readable medium comprising program code instructions which, when executed by a processor, cause the processor to perform the method according to claim 1.

* * * * *